United States Patent [19]
Doin et al.

[11] 3,931,709
[45] Jan. 13, 1976

[54] METHOD OF LOADING A SOLID FUEL ROCKET ENGINE

[75] Inventors: Bernard Jean Felix Victor Doin; Robert Omer Emmanuel Grebert; Yves Pierre Jouhaud, all of Saint Medard en Jalles, France

[73] Assignee: Societe Nationale des Poudres et Explosifs, France

[22] Filed: Oct. 29, 1974

[21] Appl. No.: 518,578

Related U.S. Application Data
[62] Division of Ser. No. 335,766, Feb. 26, 1973, abandoned.

[30] Foreign Application Priority Data
Mar. 3, 1972   France .............................. 72.07377

[52] U.S. Cl. ..................... 60/255; 60/39.47; 86/1 R; 102/99
[51] Int. Cl.² ..................... F02K 9/04; C06B 21/00
[58] Field of Search .......... 60/253, 255, 39.47, 254, 60/256; 86/1 R, 20 R, 20 B, 20 C, 20 D; 102/99

[56] References Cited
UNITED STATES PATENTS
3,397,539   8/1968   Schubert ........................... 60/255 X Primary Examiner—Carlton R. Croyle
Assistant Examiner—Robert E. Garrett
Attorney, Agent, or Firm—Bucknam and Archer

[57] ABSTRACT

One or both ends of the body of a solid fuel rocket engine is provided with an internally thickened portion, which serves for the mechanical attachment of additional parts, that is the rocket head or the rocket base, to the end of the engine body, without any increase in the external cross-sectional dimension of the body. A block of propellant fuel is located within the engine body and has a portion of reduced cross-sectional dimensions corresponding to the internally thickened portion at the end of the engine body. The block is introduced into the body by cooling the former until its dimensions have shrunk sufficiently for it to be introduced.

3 Claims, 2 Drawing Figures

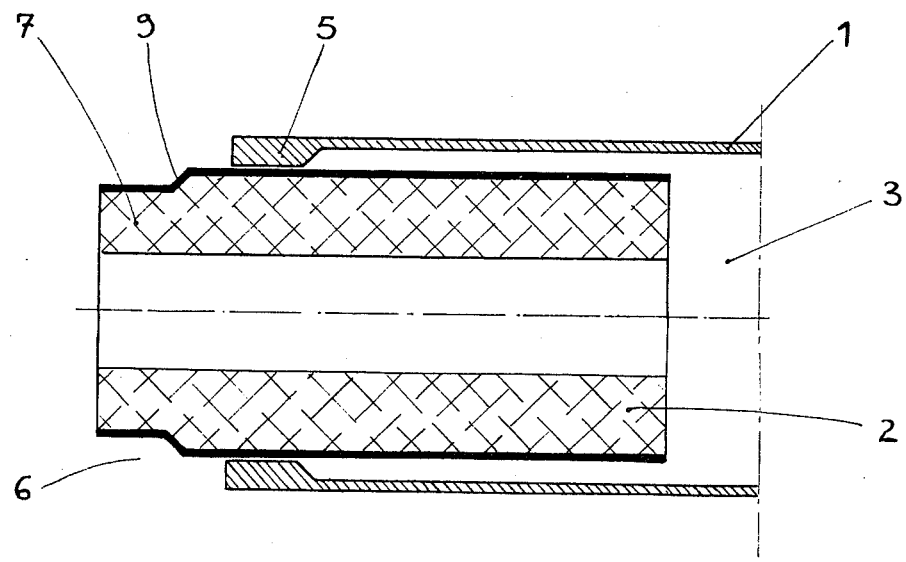
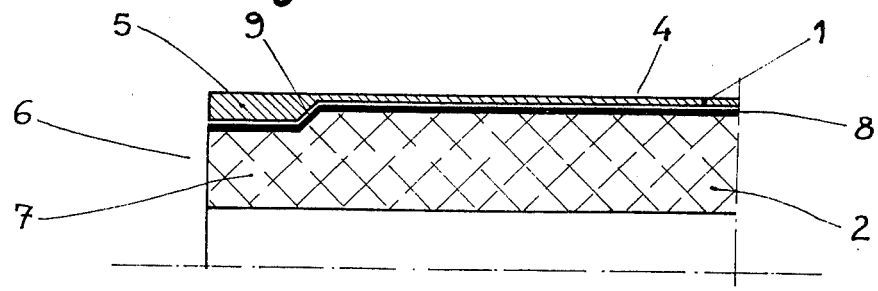

METHOD OF LOADING A SOLID FUEL ROCKET ENGINE

This is a division of application Ser. No. 335,766 filed Feb. 26, 1973, now abandoned.

The present invention relates to solid fuel rocket engines which may be used for aircraft propulsion, for missiles, for pyrotechnic purposes or otherwise, to a method of introducing a block of propellant fuel into such a rocket engine, and to a block of propellant fuel for this purpose.

So-called "free" blocks of propellant fuel are frequently used in small solid fuel rocket engines. These blocks are manufactured independently of the rocket engine, for example by extrusion, and are then introduced into the engine. Their outer shape is frequently cylindrical and they are located in the combustion chamber of the body of the engine which is itself cylindrical. In order to be able to introduce the block in this way, the combustion chamber must have an aperture having a diameter at least equal to the diameter of the block. The chamber is closed by means of mechanical parts which extend the body of the engine, for example a base carrying an exhaust nozzle for the combustion products of the propellant, and the attaching of these parts, usually achieved by a screw thread or by a system of clips, necessitates providing an extra thickness at the end of the engine body. This extra thickness is necessarily located on the outside, which increases the external dimensions of the engine, and substantially decreases its performance by increasing the drag to which it is subjected.

We have now devised a rocket engine construction which enables a maximum amount of propellant fuel to be accommodated within the combustion chamber with no extra thickness being present on the outside of the engine body.

According to the present invention, we provide a solid fuel rocket engine including at least one block of propellant fuel, which has been preshaped before inserting it into the body of the engine and in which the thickening of the wall of the body necessary for attaching thereto a mechanical part at at least one of its ends is located on the inside of the body with no increase in the external dimensions of the body, the body thus defining a combustion chamber which is of reduced cross-section at the end through which the block of propellant fuel is inserted into the chamber, the block having an end portion of correspondingly reduced cross-section and the external dimensions of the remainder of the block being greater than the cross-sectional dimensions of said end of reduced cross-section.

The body of the engine is preferably in the form of a cylindrical tube, with the combustion chamber and the block of propellant fuel being correspondingly cylindrical. As indicated above either one or both of the ends of the body of the engine may be provided with internal wall thickening to provide for the attachment of a mechanical part, that is either the head of the engine or an exhaust nozzle part.

The present invention also comprises a method of introducing the block of propellant fuel into the combustion chamber of a rocket engine according to the invention, in which the block of propellant fuel is cooled to such a temperature that its maximum cross-sectional dimension is less than the minimum dimension of said end of the chamber of reduced cross-section and, at this temperature, the block is rapidly introduced into the chamber through said end of reduced cross-section.

In order that the invention may be more fully understood, a preferred embodiment of rocket engine, and the assembly thereof, will now be described, by way of example, with reference to the accompanying drawings in which:

FIG. 1 is a diagrammatic axial section of the body of a rocket engine having a block of propellant fuel located therein, and FIG. 2 is a similar section of the same components as in FIG. 1, during the operation of introducing the block of propellant fuel into the combustion chamber of the body of the rocket engine.

In general terms, a rocket engine will comprise an engine body portion in which the propellant charge is located, a head portion containing particular devices, and a base portion comprising an exhaust nozzle.

FIGS. 1 and 2 show only the end of the body 1 of the rocket engine, the interior of which constitutes a combustion chamber 3 in which the block of propellant fuel 2 is located. The external surface 4 of the body is free from any extra thickness and the external diameter of the engine is determined by that of the propellant charge it is required to accommodate. The end of the body 1 has an internally thickened portion 5 as required for attaching the mechanical parts which are attached thereto, for example a base comprising a convergent region followed by a divergent region and forming an exhaust nozzle which is attached to the end 6. The block 2 has a correspondingly shaped end 7 which fits within the thickened portion 5, and which is of smaller diameter than the remainder of the block.

The increased thickness of the portion 5 is preferably the same whatever the length of the engine body; the thickened portion can, for example, be externally screw-threaded for attachment of the rocket base. The thickened portion 5 thus, on the one hand, represents a volume of material available for the formation of a mechanical connection between the engine body and an associated part, such as the rocket base, and, on the other hand, its maximum dimensions have to be compatible with the process for introducing the block of propellant fuel which will be described below.

In the operating position (FIG. 1), the block of propellant fuel 2, which is coated over its entire outer cylindrical surface with an inhibitor 8 is held in the combustion chamber 3 by, for example, gluing to the front base of the engine body which is used for attaching the head of the rocket engine. The block 2, for example of 150 mm diameter, is held concentric relative to the combustion chamber 3 which has an internal diameter of, for example, 151.6 mm so that there is a radial clearance of 0.8 mm between the block and the wall of the combustion chamber at the normal temperature of +20°C. The portion 7 of reduced diameter is, for example, a cylinder of 146.4 mm diameter, while the internal diameter of the thickened portion 5 is, for example, 148 mm. On the basis of these exemplary dimensions, the present invention enables the weight of propellant fuel to be increased by approximately 3.5 percent without changing the external diameter of the engine body.

It is preferred that the minimum diameter of the thickened portion 5 should be at least 96 percent of the internal diameter of the combustion chamber, the external diameter of the block being, at normal temperature, greater than the internal diameter of thickened portion 5.

The introduction of the block 2 into the combustion chamber 3 will be described with reference to FIG. 2. The dimensions mentioned above will again be taken by way of example and additionally the coefficients of linear expansion of the propellant fuel and of the inhibitor will be taken as being similar and substantially equal to $2 \times 10^{-4}$ mm/°C.

The block of inhibited propellant fuel is placed in a refrigerating chamber and the temperature is gradually lowered to −60°C. After a temperature stabilisation period, the external diameter of the block 2 is 147.6 mm, whilst the internal diameter of thickened portion 5 is, as stated above, 148 mm, the engine body being at normal ambient temperature. The block is then removed from the refrigerating chamber and introduced rapidly through the end 6 of the engine body. A theoretical radial clearance of 0.2 mm is necessary at the start of the introduction operation because heat exchanges between the engine body and the block tend to decrease this clearance. It should be noted that when the block is of considerable length, it is advantageous to heat the engine body to a temperature above normal ambient temperature, for example to 40°C, in order to have a longer period of time available for the introduction. When the portion 7 of the block has been brought into register with the thickened portion 5 of the engine body the two parts are kept in this relative position until the temperature of the combination equilibrates with ambient temperature and the block 2 is then permanently located within the combustion chamber 3. In order to make it easier to position the block and the engine body relative to one another, a bevelled edge 9 is preferably provided at the junction of the two cylindrical surfaces of the block of propellant fuel, on the one hand, and of the combustion chamber, on the other hand.

In more general terms, the temperature to which the block of propellant fuel is cooled may typically be from −80°C to −40°C and can be even lower in certain particular applications, but in this case, the risk of detachment at the interface between the propellant fuel and the inhibitor makes it necessary to choose an inhibitor which is sufficiently adherent at such low temperatures. A suitable inhibitor is, for example, a thin coating of silicone resin. In order to avoid the necessity for too great a contraction of the block, and particularly when the engine body is made of a material having a sufficiently high coefficient of linear expansion, although less than the coefficient of the fuel, it can be of value to heat the engine body to a temperature slightly above ambient temperature when the block is being introduced. This may also be done in order to reduce the amount of cooling to which the block has to be subjected, which reduction may be as much as 25 percent. Moreover, the dimensions of the block and of the combustion chamber are advantageously chosen so that a residual clearance exists between the block and the internal surface of the combustion chamber, the clearance being necessary to enable the block to remain free up to the maximum storage temperature.

What is claimed is:

1. A method of introducing a block of solid propellant fuel into the combustion chamber of the body of a solid fuel rocket engine, said rocket engine being of uniform outer diameter, and comprising a cylindrical body portion, at least one cylindrical block of propellant fuel within said body portion, said body portion defining a cylindrical combustion chamber, means for attaching mechanical parts located within said body portion, said chamber comprising at least one portion of increased internal wall thickness at one end of said body portion, whereby said chamber has reduced cross section in the end of increased internal wall thickness, and an opening at the end of said reduced cross section for insertion of said cylindrical block of propellant fuel, said block having an end portion of reduced cross section, which comprises cooling the block of propellant fuel to such a temperature that its maximum cross-sectional dimension is less than the minimum dimension of said end of the chamber of reduced cross-section and rapidly introducing at this temperature, the block into the combustion chamber through said end of reduced cross-section.

2. A method according to claim 1, in which the block of propellant fuel is cooled to between −80° and −40°C.

3. A method according to claim 1, in which the body of the engine is at a temperature above ambient temperature when the block is introduced into the combustion chamber.

* * * * *